US010328324B1

(12) United States Patent
Case

(10) Patent No.: US 10,328,324 B1
(45) Date of Patent: Jun. 25, 2019

(54) RUNNING TRAINING AID TO PROVIDE AUDITORY FEEDBACK ON PROPER ARM MECHANICS

(71) Applicant: David Allen Case, Thousand Oaks, CA (US)

(72) Inventor: David Allen Case, Thousand Oaks, CA (US)

( * ) Notice: Subject to any disclaimer, the term of this patent is extended or adjusted under 35 U.S.C. 154(b) by 362 days.

(21) Appl. No.: 15/401,826

(22) Filed: Jan. 9, 2017

(51) Int. Cl.
 *A63B 69/00* (2006.01)
 *G09B 19/00* (2006.01)
 *G09B 5/04* (2006.01)
 *A63B 71/06* (2006.01)

(52) U.S. Cl.
 CPC ...... *A63B 69/0028* (2013.01); *A63B 71/0622* (2013.01); *G09B 5/04* (2013.01); *G09B 19/0038* (2013.01); *A63B 2071/0625* (2013.01); *A63B 2220/836* (2013.01)

(58) Field of Classification Search
 None
 See application file for complete search history.

(56) References Cited

U.S. PATENT DOCUMENTS

| 7,147,590 | B2* | 12/2006 | Toven | A63B 69/0028 |
| | | | | 482/51 |
| 10,127,828 | B2* | 11/2018 | Arnold | A63B 21/00185 |
| 2011/0224009 | A1* | 9/2011 | Shan | A63B 69/0059 |
| | | | | 473/213 |
| 2016/0228755 | A1 | 8/2016 | Doyle | |
| 2017/0291100 | A1* | 10/2017 | Byron | A63B 69/0046 |

* cited by examiner

*Primary Examiner* — James B Hull
(74) *Attorney, Agent, or Firm* — Plager Schack LLP

(57) ABSTRACT

A running training aid for use by a user to provide auditory feedback on arm mechanics is provided. The running training aid includes a body strap disposed around the user's chest and back areas, a reinforcement pad coupled to a portion of the body strap, a pair of clickers detachably coupled to any portion of the body strap coupled to the reinforcement pad, and a pair of arm bands coupled to the body strap and designed to wrap around the user's arms, each arm band coupled to one of the pair of clickers. Motion of any arm of the user in a backswing direction permits the arm band attached thereon to apply a force on the clicker connected thereto, thereby permitting the clicker to generate an audible alert when the arm travels a predetermined distance.

10 Claims, 3 Drawing Sheets

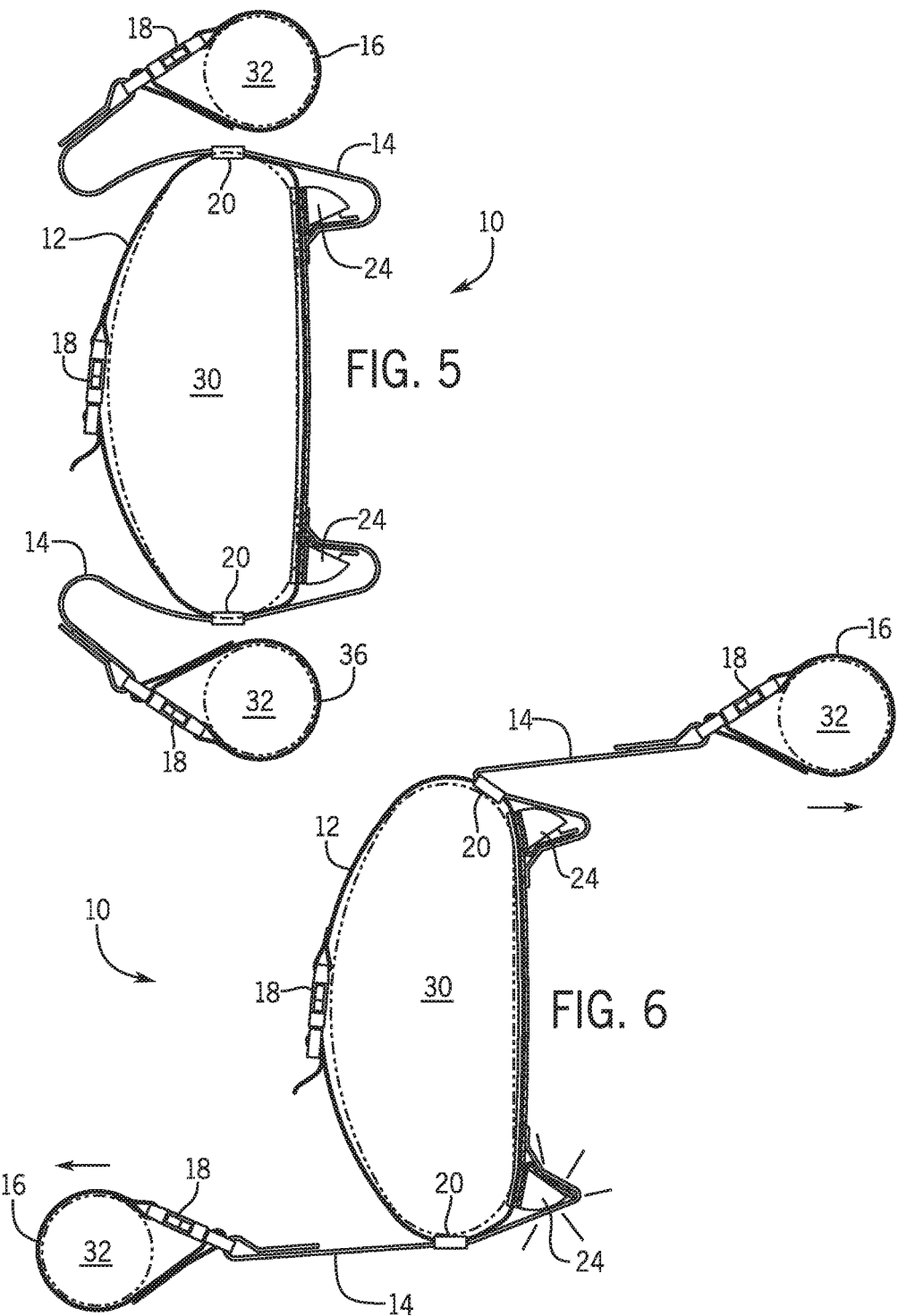

RUNNING TRAINING AID TO PROVIDE AUDITORY FEEDBACK ON PROPER ARM MECHANICS

BACKGROUND

The embodiments herein relate generally to training aids and methods for individuals and athletes engaging in running activities.

Although sprinting and distance running are primarily lower body activities, proper arm mechanics are particularly important to control tension in the individual's body. The arm swing works in conjunction with the individual's legs and helps to propel him/her forward. More importantly, the proper arm swing enhances runner stability by counteracting the angular momentum produced by the swinging legs and reducing the side-to-side motion of the body's center of mass. The proper arm swing also helps to reduce energy expenditure, which enhances overall running performance.

In running, athletes often do not achieve a proper backswing because their elbows do not drive far enough back into the back space of arm mechanics. This defect in arm mechanics reduces the runner's efficiency by putting generated forces from the arms into inefficient areas, thereby reducing the runner's overall speed. Ultimately, this inefficiency in arm mechanics can negatively affect an athlete's performance in sports or activities that require running including, but not limited to, distance running, cross-country, track and field, football, soccer, basketball and baseball.

Coaches and trainers often provide feedback to athletes who perform sprinting exercises. However, this feedback on the athlete's backswing is not in real-time and is unavailable when the coach or trainer is not present. Several running training aids exist as disclosed in U.S. Patent Application Publication 2016/0228755 and U.S. Pat. No. 7,147,590. However, these training aids are limited because they require the use of complex or bulky components and/or do not provide real-time audible feedback on whether the user's arms have been driven far enough in the backswing to achieve proper backside arm mechanics.

As such, there is a need in the industry for a running training aid that addresses the limitations of the prior art, which effectively provides auditory feedback on the arm mechanics of a user during a training session. There is a further need for the running training aid to generate an audible alert to affirm proper backside arm mechanics when the user's arms travel the proper distance during the backswing. There is a further need for the running training aid to provide continuous feedback to the user without the need for a coach to be present.

SUMMARY

A running training aid for use by a user to provide auditory feedback on arm mechanics is provided. The running training aid is configured to generate an audible alert when arms of the user travel a predetermined backswing distance that achieves proper arm mechanics. The running training aid comprises a body strap disposed around a chest area and a back area of the user, the body strap comprising a first end and a second end detachably coupled together to secure the body strap to the user, a reinforcement pad coupled to a portion of the body strap, a pair of clickers detachably coupled to any portion of the body strap coupled to the reinforcement pad, and a pair of arm bands coupled to the body strap and configured to wrap around arms of the user, each arm band of the pair of arm bands coupled to one of the pair of clickers and configured to adjust to conform securely to an arm of the user, wherein motion of any arm of the user in a backswing direction permits the arm band attached thereon to apply a force on the clicker connected thereto, thereby permitting the clicker to generate the audible alert when the arm travels the predetermined distance. In certain embodiments, a pair of connecting straps are coupled to the pair of arm bands and the body strap.

BRIEF DESCRIPTION OF THE FIGURES

The detailed description of some embodiments of the invention will be made below with reference to the accompanying figures, wherein the figures disclose one or more embodiments of the present invention.

FIG. 5 depicts a top plan schematic view of certain embodiments of the running training aid at rest; and FIG. 6 depicts a top plan schematic view of certain embodiments of the running training aid in use.

DETAILED DESCRIPTION OF CERTAIN EMBODIMENTS

Figure 1:
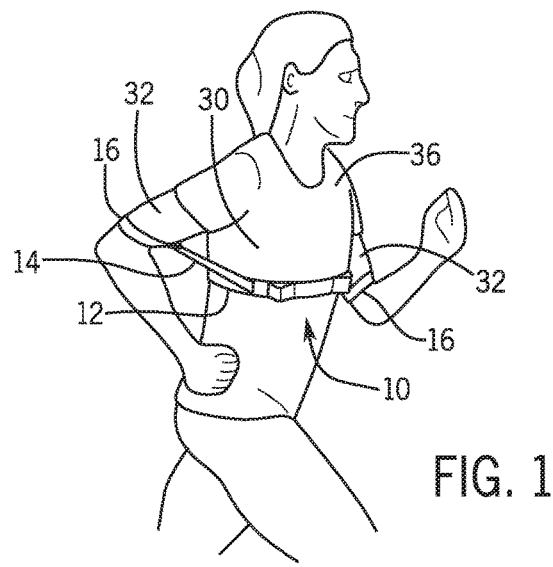
FIG. 1 depicts a perspective view of certain embodiments of the running training aid in use.
Figure 2:
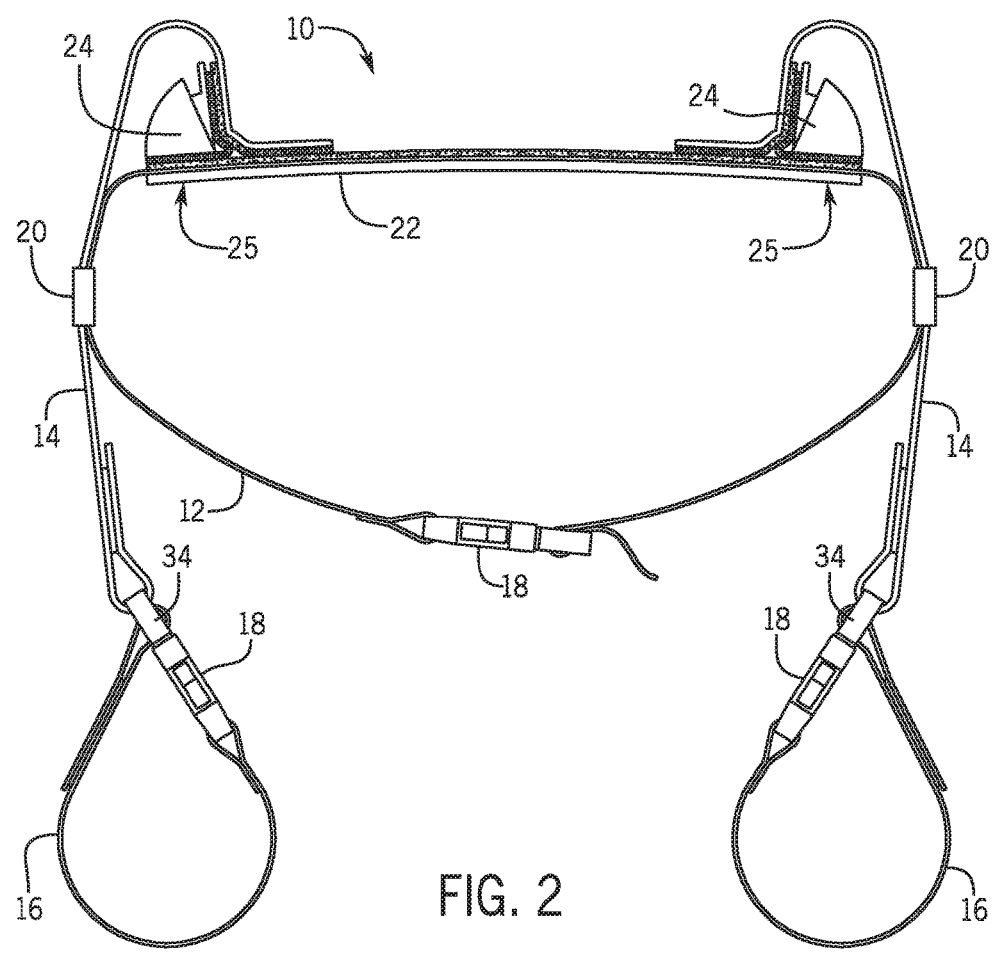
FIG. 2 depicts a top view of certain embodiments of the running training aid.
Figure 3:
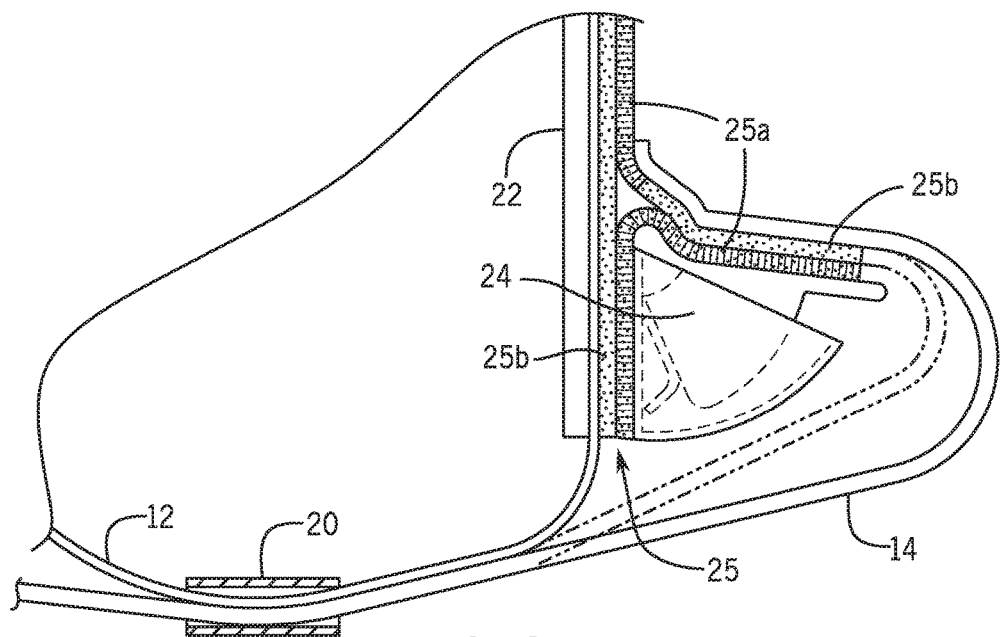
FIG. 3 depicts a top view of certain embodiments of the running training aid illustrating clicker 24.

As depicted in FIGS. 1-3, running training aid 10 is secured to torso 30 and arms 32 of user 36 and is configured to provide feedback on whether proper arm mechanics is achieved by the user when running, particularly in the backswing of the arms. This is particularly beneficial during training sessions designed to permit user 36 to develop muscle memory of the proper form and arm mechanics to maximize running speed and efficiency. It shall be appreciated that running training aid 10 is beneficial for use in a variety of sports and activities that require running including, but not limited to, sprinting, distance running, track and field, cross-country, football, soccer, basketball and baseball. Running training aid 10 generally comprises body strap 12, connecting straps 14, arm bands 16, reinforcement pad 22 and clickers 24.

In certain embodiments of the invention, body strap 12 comprises an elastic band member comprising first and second ends detachably coupled together by buckle 18. The length of body strap 12 can be adjusted via the components of buckle 18 such that body strap 12 securely conforms to torso 30 of user 36 including the chest and back areas. Reinforcement pad 22 is preferably made from plastic and is coupled to the interior of body strap 12 by a fastener such as glue. In one embodiment, a pair of slip sleeves 20 is coupled to body strap 12 by stitching.

A pair of clickers 24 is detachably coupled to any portion of body strap 12 coupled to reinforcement pad 22 by clicker fasteners 25. Reinforcement pad 22 provides the rigidity and support necessary for clickers 24 to operate and emit an audible click sound. In one embodiment, clickers 24 are coupled to body strap 12 proximate opposing ends of reinforcement pad 22. As depicted in FIGS. 2-3, clicker hook fastener 25*a* is coupled to clicker 24 by an adhesive such as glue or other fastening component. Clicker loop fastener 25*b* is coupled to body strap 12 by glue and/or stitching along the portion of the body strap coupled to reinforcement pad 22. This permits clickers 24 to be secured to different portions on body strap 12 to accommodate the particular size of user 36 and/or exercise difficulty level.

A pair of connecting straps 14 are preferably made from webbing and comprise an approximate width of ¾" and variable lengths to accommodate user 36. Connecting straps 14 comprise first end portions detachably coupled to clickers 24 and second end portions detachably coupled to arm bands 16. As depicted in FIGS. 2-3, the first end portion of each connecting strap 14 comprises clicker loop fastener 25b coupled thereto and configured to engage with clicker hook fastener 25a on clicker 24 and clicker hook fastener 25a coupled thereto and configured to engage with clicker loop fastener 25b on body strap 12. It shall be appreciated that the size of clicker hook fastener 25a and clicker loop fastener 25b on connecting strap 14 may vary. Connecting straps 14 extend through slip sleeves 20. This permits connecting straps 14 to slidably adjust within slip sleeves 20 as needed.

Figure 4:
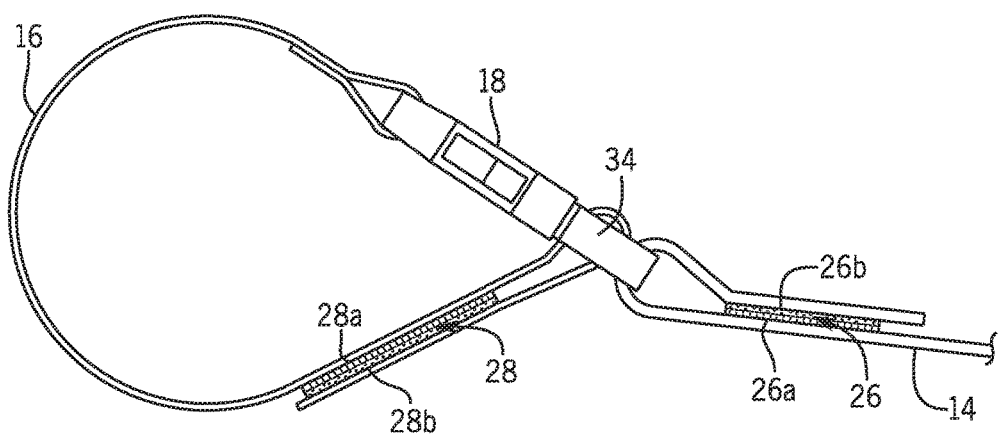
FIG. 4 depicts a top view of certain embodiments of the running training aid illustrating arm band 16.

As depicted in FIGS. 2 and 4, a pair of arm bands 16 are detachably coupled to second end portions of connecting straps 14 by tri-glide fasteners 34 and buckles 18. The second end portion of each connecting strap 14 extends through tri-glide fastener 34 and is secured to itself by connecting strap fasteners 26, which preferably comprises connecting strap hook fastener 26a and connecting strap loop fastener 26b. Connecting strap hook and loop fasteners 26a, 26b are preferably secured to connecting strap 14 by stitching. The slidable adjustment of connecting strap 14 through tri-glide fastener 34 permits the distance between clicker 24 and arm band 16 to be adjusted as needed.

Each arm band 16 comprises a first end portion coupled to tri-glide fastener 34 by buckle 18 and a second end portion that extends through tri-glide fastener 34 and is secured to itself by arm band fasteners 28, which preferably comprises arm band hook fastener 28a and arm band loop fastener 28b. Arm band hook and loop fasteners 28a, 28b are preferably secured to arm band 16 by stitching. The slidable adjustment of arm band 16 through tri-glide fastener 34 varies the size of the loop created by arm band 16 to conform to arm 32 of user 36.

In operation, running training aid 10 is secured to user 36 as shown in FIG. 1. In the secured position, reinforcement pad 22 extends along the front chest area of user 36. FIG. 5 depicts a schematic view of running training aid 10 in a rest position. As user 36 swings arms 32 during a run, running training aid 10 provides real-time feedback on whether a proper backswing is achieved. Specifically, training aid 10 generates an audible click sound when an arm and elbow of user 36 is driven far enough back into the back space to achieve proper arm mechanics.

FIG. 6 depicts a first arm 32 in the forward swing and a second arm 32 in the backswing. Arm 32 in the backswing pulls arm band 16 and connecting strap 14 backward. When arm 32 travels a predetermined ideal distance in the back swing, arm band 16 applies a force on clicker 24 through connecting strap 14, which permits clicker 24 to generate the audible click sound. As a result, user 36 can monitor whether he/she is achieving proper arm mechanics on the backswing with both arms 32 based on the presence or absence of a click sound from clickers 24.

In alternative embodiments, running training aid 10 may be equipped with electronic equipment such as digital sensors that can communicate with other remote electronic devices such as smartphones, tablets, laptops and other computing devices via wired or wireless connections. In certain embodiments, these remote electronic devices can perform analyses on the user's arm mechanics via software applications and programs.

It shall be appreciated that the components of running training aid 10 described in several embodiments herein may comprise any alternative known materials in the field and be of any color, size and/or dimensions. It shall be appreciated that the components of running training aid 10 described herein may be manufactured and assembled using any known techniques in the field. Although components of running training aid 10 are described as being secured together by hook and loop fasteners, it shall be appreciated that alternative fasteners known in the field may be used instead such as snap components, slide fasteners, or the like.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A running training aid for use by a user to provide auditory feedback on arm mechanics, the running training aid configured to generate an audible alert when arms of the user travel a predetermined backswing distance that achieves proper arm mechanics, the running training aid comprising:
   a body strap disposed around a chest area and a back area of the user, the body strap comprising a first end and a second end detachably coupled together to secure the body strap to the user;
   a reinforcement pad coupled to a portion of the body strap;
   a pair of clickers detachably coupled to any portion of the body strap coupled to the reinforcement pad; and
   a pair of arm bands coupled to the body strap and configured to wrap around arms of the user, each arm band of the pair of arm bands coupled to one of the pair of clickers and configured to adjust to conform securely to an arm of the user;
   wherein motion of any arm of the user in a backswing direction permits the arm band attached thereon to apply a force on the clicker connected thereto, thereby permitting the clicker to generate the audible alert when the arm travels the predetermined distance.

2. The running training aid of claim 1, further comprising a pair of connecting straps coupled to the pair of arm bands and the body strap, each connecting strap of the pair of connecting straps comprising a first end portion detachably coupled to one of the pair of clickers and a portion of the body strap, and a second end portion detachably coupled to one of the pair of arm bands.

3. The running training aid of claim 2, wherein each connecting strap of the pair of connecting straps is slidably mounted to another portion of the body strap via a slip sleeve.

4. The running training aid of claim 3, wherein the second end portion of each connecting strap is coupled to one of the pair of arm bands by a tri-glide fastener.

5. The running training aid of claim 4, wherein the second end portion of each connecting strap is configured to slidably adjust through the tri-glide fastener and detachably couple to the connecting strap to vary spacing between the one of the pair of arm bands and the one of the pair of clickers.

6. The running training aid of claim 5, wherein each arm band in the pair of arm bands comprises a first end portion coupled to the tri-glide fastener by an arm band buckle and a second end portion configured to slidably adjust through the tri-glide fastener to vary a size of a loop created by the arm band, the second end portion configured to detachably couple to the arm band.

7. The running training aid of claim 6, wherein each clicker in the pair of clickers is detachably coupled to both the connecting strap and the body strap by hook and loop fasteners.

8. The running training aid of claim 7, wherein the first and second ends of the body strap are detachably coupled together by a body strap buckle.

9. The running training aid of claim 8, wherein the pair of connecting straps is made from webbing.

10. The running training aid of claim 9, wherein the pair of clickers is coupled to the body strap proximate opposing ends of the reinforcement pad.

\* \* \* \* \*